E. LUNKENHEIMER.

Assignor to F. LUNKENHEIMER.

STRAIGHT WAY VALVE.

No. 10,769. Reissued Sept. 28, 1886.

Attest.
S. S. Carpenter
Paul Carpenter

Inventor.
E. Lunkenheimer
by James H. Layman
Atty.

UNITED STATES PATENT OFFICE.

EDMUND LUNKENHEIMER, OF CINCINNATI, OHIO, ASSIGNOR TO FREDERICK LUNKENHEIMER, OF SAME PLACE.

STRAIGHT-WAY VALVE.

SPECIFICATION forming part of Reissued Letters Patent No. 10,769, dated September 28, 1886.

Original No. 341,421, dated May 4, 1886. Application for reissue filed July 1, 1886. Serial No. 206,861.

*To all whom it may concern:*

Be it known that I, EDMUND LUNKENHEIMER, of Cincinnati, in the county of Hamilton and State of Ohio, have invented certain new and useful Improvements in Straight-Way Valves; and I do hereby declare the following to be a full, clear, and exact description thereof, reference being had to the accompanying drawings, which form a part of this specification.

This invention relates to those devices in which an oscillating valve is swung aside to permit a straight and unobstructed passage through an inclosing-shell; and the first feature of my improvements comprises a novel arrangement of parts that insures a very compact and cheap construction. The shell is accordingly made with two pipe-connections in line with each other, which connections communicate with the main chamber, that receives the valve when the latter is closed, said chamber being provided with a lateral nozzle or neck, into which said valve swings in the act of opening. This oscillating valve is hung upon the free end of a carrier attached to a shaft or spindle, which spindle rocks within a tubular portion of the shell, the axis of said tube being parallel with the axis of the pipe-connections, but located at one side of the shell, and at such a distance from the pipe-connections and lateral neck of the main chamber as to afford the proper swing of said carrier, as hereinafter more fully described.

The second feature of my improvements consists in providing the free end of the carrier with a beveled shoulder adapted to come in contact with an inclined projection, and thereby force the oscillating valve against its seat in the shell, as hereinafter more fully described.

The third feature of my improvements consists in providing the oscillating valve with a short central stem that bears against a screw tapped in the carrier, by which arrangement any wear either of the valve or seat may be readily compensated for, as hereinafter more fully described.

The fourth feature of my improvements consists in placing a rib diametrically across the valve-seat, for the purpose of preventing any tilting or side play of the valve while it is being opened and closed, as hereinafter more fully described.

The fifth feature of my improvements consists in providing the carrier with a shoulder that serves as a stop to prevent the open valve coming in contact with the cap of the neck, as hereinafter more fully described.

Figure 1:
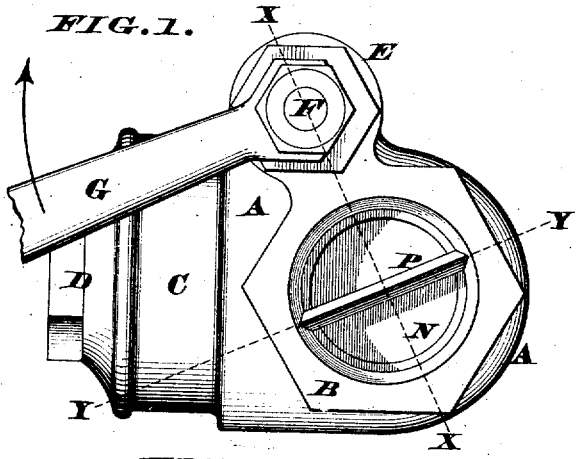
Figure 2:
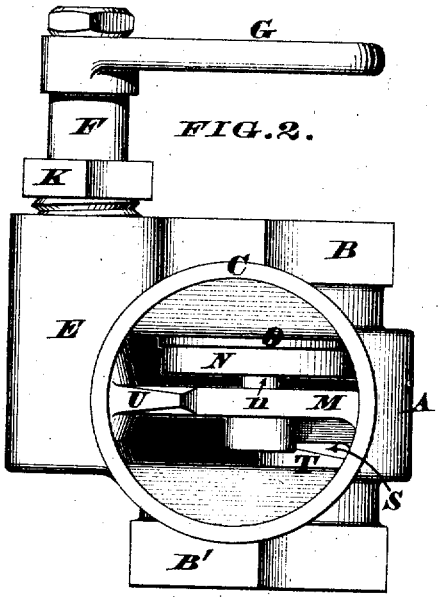
Figure 4:
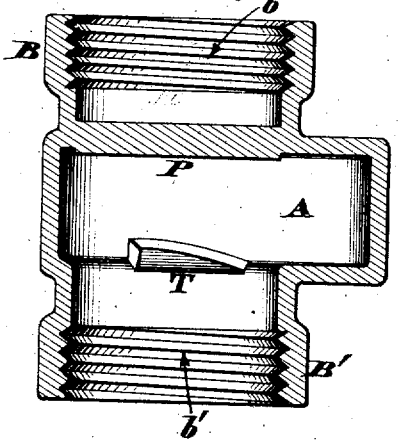
Figure 3:
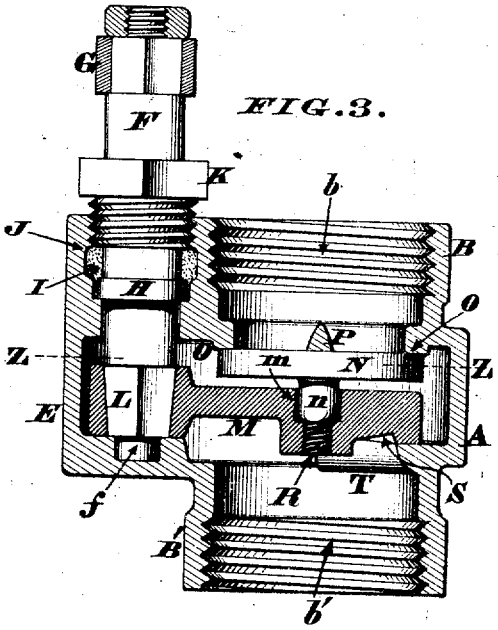
Figure 5:
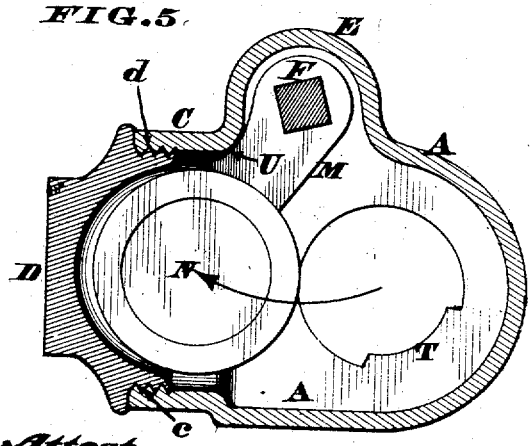

In the annexed drawings, Figure 1 is a plan of my improved valve, the valve proper being closed. Fig. 2 is an elevation of the same, the cap being removed from the neck. Fig. 3 is a vertical section taken at the inclined line X X of Fig. 1. Fig. 4 is another section at the line Y Y of said illustration. Fig. 5 is transverse section at the line Z Z of Fig. 3, the valve being open.

A represents the main chamber of the valve, and B B′ are pipe connections communicating therewith, said connections being in line with each other, and provided with female threads *b b′*. Projecting laterally from this chamber, and at a right angle thereto, is a nozzle or neck, C, threaded internally at *c*, as seen in Fig. 5, to receive the screw *d* of the detachable cap D, the removal of which affords convenient access to the interior of the main chamber A, as shown in Fig. 2.

E represents a tubular portion of the casing, the axis of said tube being parallel with the central line of the coincident pipe-connections B B′, as seen in Fig. 3. Furthermore, this tube occupies such a position between the pipe-connection B and neck C as to insure a proper swinging of the oscillating valve without unduly increasing either the size or weight of the device. In practice I prefer locating this tube about at an angle of sixty degrees with reference to the axis of the pipe-connections, as indicated in Fig. 1 by the dotted line X X.

The main chamber A, pipe-connections B B′, lateral neck C, and tubular portion E are all a single casting, and constitute the valve shell or casing. Adapted to rock within this tubular portion E is a shaft or spindle, F, the inner end of which, *f*, is journaled in a suitable bearing of the shell, while the outer end of said spindle carries a handle, G. Furthermore, this spindle has a collar, H, against which is compressed the packing I, the latter being confined within an ordinary stuffing-box, J, by a screw-threaded gland, K. Spindle F has a square, L, that traverses an eye in one end of a vibrating carrier, M, the free end of the latter having a socket, *m*, to receive a short stem, *n*, projecting centrally from the rear of the oscillating valve N. This valve may be of the usual or any approved construction, and has a rim ground to fit snugly against the seat O, the latter being furnished with a diametrical rib, P, which serves as a support for said valve, both when it is being opened and closed. Consequently the valve cannot tip over to one side and wear unevenly. Valve-stem *n* bears against a screw, R, tapped in the carrier M, which screw enables the valve to be adjusted so as to compensate for any wear occasioned either by use or regrinding. The free end of this carrier has a downwardly-beveled shoulder, S, which, when the carrier is swung around to close the valve N, ascends an inclined projection, T, of the shell, thereby forcing said valve evenly and positively against the seat O, as will be readily understood.

To prevent injury to the valve when it is thrown wide open, I provide the carrier with a stop-shoulder, U, which comes in contact with the interior of the shell, as seen in Fig. 5, and thus prevents said valve striking the cap D. From the above description it is evident that when the handle G is brought down to the position seen in Fig. 1 the valve N closes against the seat O, thus stopping communication between the pipe-connections. It is also evident that as this valve is not rigidly coupled to the carrier M, sufficient play is allowed to enable the correct closure of the former, although said carrier may not move in a plane exactly parallel with the seat O. In case there should be any material wear of the parts, either by constant use or the necessity of regrinding, such loss can be readily compensated for by properly turning the screw R after the carrier M has been taken out of the inclosing-shell. This removal of the carrier can be accomplished in a few minutes, the first step in the proceeding being to unscrew the gland K and then withdraw the spindle F. After this act cap D is unscrewed and the valved end of the carrier is lifted out of the shell, the removal of said cap affording unobstructed access to the interior of chamber A, and without disturbing the pipe-connections B B′. (See Fig. 2.) By elevating the handle G, as indicated by the arrow in Fig. 1, the valve N will be swung aside in the direction of the arrow seen in Fig. 5, thereby affording a straight, direct, and unobstructed passage through said shell, the stop-shoulder U preventing said valve striking the cap D, no matter how quickly the handle may be thrown up.

While I have shown a single valve and seat as the preferred form of my invention, it is evident a double valve may be employed to fit seats on both the upper and lower sides of the main chamber, both of which valves would be hung upon and operated by the carrier.

I claim as my invention—

1. The combination, in a straight-way valve, of a vibrating carrier having a loosely-coupled valve applied to its free end, said carrier being adapted to impinge against a wedge or beveled bearing, and thereby force said valve to its seat with a positive closing movement, substantially as described.

2. The combination, in a straight-way valve, of a vibrating carrier having a loosely-coupled adjustable valve applied to its free end, said carrier being adapted to impinge against a wedge or beveled bearing, and thereby force said valve to its seat with a positive closing movement, substantially as described.

3. In a straight-way valve, the main chamber A and removable cap D, in combination with the rock-shaft F, vibrating carrier M, loosely-coupled valve N, beveled shoulder S, and a wedge or inclined projection, T, for the purpose described.

4. The combination, in a straight-way valve, of vibrating carrier M *m*, loosely-coupled valve N *n*, and adjusting-screw R, for the purpose described.

5. The combination, in a straight way valve, of a vibrating carrier having a loosely-coupled valve applied to its free end, said carrier being provided with a stop that prevents the open valve coming in contact with the interior of the shell, substantially as described.

6. The combination, with a valve and its seat, of a rib, as P, extending diametrically across and connecting opposite sides of the seat, and with its lower edge in the same plane therewith, whereby tilting of the valve is prevented, substantially as described.

7. A valve-shell consisting of the main chamber A, provided with pipe-connections B B′ in line with each other, a neck, C, projecting laterally from said chamber, and a tubular portion, E, located between said chamber and neck and having its axis parallel with the axis of said pipe-connections, these parts A, B, B′, C, and E being integral, as herein described.

8. A shell provided with a rib, the bearing-surface of which is in the same plane as the seat against which the valve closes, whereby tilting of the latter is prevented, substantially as herein described.

In testimony whereof I affix my signature in presence of two witnesses.

EDMUND LUNKENHEIMER.

Witnesses:
JAMES H. LAYMAN,
SAML. S. CARPENTER.